Oct. 5, 1943.   J. J. WENT ET AL   2,331,088
SOLDERING IRON
Filed Jan. 15, 1941
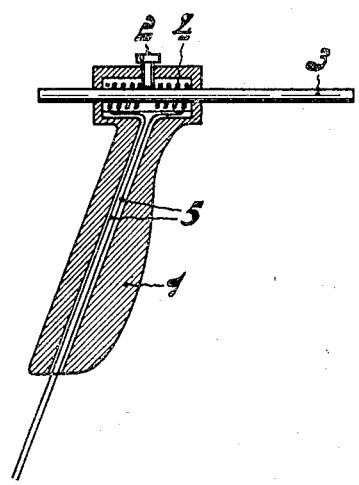
INVENTORS
JAN JACOBUS WENT
PIETER VAN NOOYEN
WILLEM DIGNUS VAN DER MOER
By
ATTORNEY.

Patented Oct. 5, 1943

2,331,088

UNITED STATES PATENT OFFICE 2,331,088

SOLDERING IRON

Jan Jacobus Went, Pieter van Nooÿen, and Willem Dignus van der Moer, Eindhoven, Netherlands; vested in the Alien Property Custodian Application January 15, 1941, Serial No. 374,590
In the Netherlands August 3, 1939

2 Claims. (Cl. 113—105)

This invention relates to a soldering iron. Soldering irons generally consist of a holder, which may act at the same time as a handle, and an active part by means of which the soldering operation is effected and which part is secured to the holder in some way or other, for instance screwed or clamped therein. This active part is heated in a suitable manner for instance, electrically, by ignition of a gaseous mixture supplied to the interior of the holder, or by simply holding the soldering iron in a flame.

Copper is generally used for the active part of these irons. However, at the temperatures occurring during the soldering operation, i. e., at temperatures of the order of magnitude of 200 to 300° C., copper is not corrosion-proof both in regard to the air and to the solder, for instance tin, and is consequently liable to rapid wear and tear. More particularly, the tin forms an alloy with the copper and particles of this alloy become detached from the copper active part of the soldering iron to thereby corrode or pit the active part. As a result of this corrosion or pitting, the copper active part is deleteriously effected, for instance its surface becomes irregular and its life is reduced. Moreover, copper softens at this temperature due to which the wear and tear of the active part is still further increased. Furthermore, due to the softness of the copper, the active part sticks to the holder and replacement of the active part made necessary by the rapid wear and tear thereof, is time consuming and consequently expensive.

The drawbacks referred to above can now be avoided for the greater part by making use of a soldering iron according to the present invention, whose active part consists of an alloy of copper containing 0.02 to 3% of zirconium, the alloy which is preferably used containing 0.1 to 1.3% of zirconium.

This alloy is endowed with the combination of suitable properties which is necessary for the active part of a soldering iron. In fact, it is very corrosion proof at high temperatures both in regard to solders such as tin and to the air. In addition the material has a very great hardness which decreases only to a very small degree at high temperatures and the electric and thermal conductivity thereof which is very important for the purpose set out above is of the order of magnitude of that of copper.

In the literature various statements are found as regards the use of copper alloys, according to which other constituents are added to the copper in order to improve the properties of this material for a special purpose. So it has been proposed for parts of electric discharge tubes to use alloys of copper and, for instance, beryllium, silicon or zirconium, these constituents being added to the copper either in order to obtain a better getter action or to make use of a material from which little gas is released during exhaustion or again to ensure that the gas released has a suitable composition.

In addition the use of copper-zirconium alloys has also been suggested for other purposes. For chemical apparatus such as autoclaves and evaporating devices it has, for instance, been proposed to make use of alloys of copper and 1 to 15% of zirconium; moreover, it has already been suggested to use welding electrodes consisting of copper containing 0.1 to 5% of zirconium, and furthermore the elasticity of these alloys and the tensile strength accompanied by a high electrical conductivity of these materials have been utilised by using these materials for springs and high tension conductors. Again alloys have come to be known which consist of copper and a small quantity of silver and zirconium, the silver being added in order to increase the hardness of the copper and the zirconium mainly acting as a de-oxidising agent, these additives proved to reduce the electrical conductivity of the copper to a small degree only; these alloys would be very suitable for parts of dynamos, as commutators and the like.

In some cases one of the properties which is important also for the field mentioned in the present case, for instance the hardness or the conductivity or the resistance to attack by air at higher temperatures sometimes played a certain part in the fields of application above referred, but as regards the combination of properties, which is important when using the material for soldering irons, nothing could be deduced from known literature about copper-zirconium alloys. In this case the unexpected result particularly is obtained that corrosion under the action of the solder, which to all probability is due to the formation of an alloy between copper and tin, is reduced to such a degree upon adding only a small quantity of zirconium that the use of this material offers very important advantages.

The advantages with respect to copper may appear from the following; the conductivity of a copper-zirconium alloy containing 0.4% of zirconium can be made 1 to 2% smaller than that of copper, and in this case the hardness (Vickers hardness) amounts to 150 for the said copper-zirconium alloy, and to 80 to 90 for hard copper. In this case the resistance to corrosion has increased about by a factor 10, i. e., the life of the active part of a soldering iron thus made has become ten times as long.

The invention will be more clearly understood by reference to the accompanying drawing in which an electric soldering iron is represented by way of example.

In this drawing the reference number 1 designates a holder which serves as a handle at the same time. By means of a clamping screw 2 a rod 3 consisting, according to the invention, of copper-zirconium is clamped in the holder. This rod constitutes the active part of the soldering iron; the rod 3 is electrically heated by a heating element 4 to which the current is supplied by conductors 5.

What we claim is:

1. A soldering iron for use with solder containing tin and in which the active part of the iron consists of an alloy of copper and 0.02 to 3% of zirconium, said alloy having a thermal conductivity similar to that of copper but being substantially harder and more resistant to corrosion in air and also more resistant to pitting action by molten tin than copper.

2. A soldering iron for use with solder containing tin and in which the active part of the iron consists of an alloy of copper and 0.1 to 1.3% of zirconium, said alloy having a thermal conductivity similar to that of copper but being substantially harder and more resistant to corrosion in air and also more resistant to pitting action by molten tin than copper.

JAN JACOBUS WENT.
PIETER van NOOŸEN.
WILLEM DIGNUS van der MOER.